United States Patent
Lindell et al.

(10) Patent No.: US 10,630,471 B1
(45) Date of Patent: Apr. 21, 2020

(54) SYSTEM AND METHOD FOR ENFORCEMENT OF CORRECTNESS FOR KEY DERIVATION

(71) Applicants: Bar Ilan University, Ramat Gan (IL); Unbound Tech Ltd, Petah Tiqva (IL)

(72) Inventors: Yehuda Lindell, Givat Shmuel (IL); Guy Pe'er, Talmey Yechiel (IL)

(73) Assignees: BAR ILAN UNIVERSITY, Ramat Gan (IL); UNBOUND TECH LTD., Petah Tiqva (IL)

(*) Notice: Subject to any disclaimer, the term of this patent is extended or adjusted under 35 U.S.C. 154(b) by 8 days.

(21) Appl. No.: 16/183,868

(22) Filed: Nov. 8, 2018

(51) Int. Cl.
| | |
|---|---|
| *H04L 29/06* | (2006.01) |
| *H04L 9/08* | (2006.01) |
| *H04L 9/32* | (2006.01) |
| *H04L 9/06* | (2006.01) |

(52) U.S. Cl.
CPC .......... *H04L 9/0861* (2013.01); *H04L 9/0643* (2013.01); *H04L 9/0894* (2013.01); *H04L 9/3252* (2013.01)

(58) Field of Classification Search
CPC .............................. H04L 9/3255; H04L 9/085
See application file for complete search history.

(56) References Cited

U.S. PATENT DOCUMENTS

| | | | | |
|---|---|---|---|---|
| 9,489,522 | B1* | 11/2016 | El Defrawy | .......... H04L 9/3218 |
| 2015/0213079 | A1* | 7/2015 | Shukla | ................ G06F 16/2365 |
| | | | | 707/687 |

OTHER PUBLICATIONS

Peter et al., "Efficiently Outsourcing Multiparty Computation Under Multiple Keys" Dec. 2013, IEEE (Year: 2013).*
Andrychowicz et al "Multiparty Computation Protocols Based on Cryptocurrencies" May 2015, University of Warsaw, PhD dissertation. pp. 1-137 (Year: 2015).*

* cited by examiner

*Primary Examiner* — Harunur Rashid
(74) *Attorney, Agent, or Firm* — Alphapatent Associates, Ltd; Daniel J. Swirsky

(57) ABSTRACT

The subject matter discloses a system for enforcing correctness of a derivation key, comprising multiple computerized nodes, comprising a storage module configured to store a share of a key used as an input of a function generating the derivation key, a communication module configured to exchange information between the multiple computerized nodes, and a processing module configured to receiving a request to create the derivation key, performing an MPC process between the multiple computerized nodes, said MPC process is performed multiple times, in each time the MPC process comprises receiving the key shares as input, randomly selecting a function, outputting the outputs of the selected function to the multiple computerized nodes, the multiple computerized nodes lack access to the selected function, the multiple computerized nodes perform computations on the received outputs and exchange outputs of the computations to estimate correction of the key shares inputted into the MPC process.

18 Claims, 3 Drawing Sheets

SYSTEM AND METHOD FOR ENFORCEMENT OF CORRECTNESS FOR KEY DERIVATION

FIELD OF THE INVENTION

The present disclosure generally relates to derivation of cryptographic keys, and more particularly relates to enforcement of correctness for key derivation.

BACKGROUND OF THE INVENTION

In crypto currencies, it is common practice to choose a single master key for the ECDSA digital signature and to derive multiple keys from that key. This has the advantage that it suffices to back up a single key, and yet many keys can be derived for the purpose of holding different accounts and having different addresses. This derivation takes for input a private derivation key (for example an ECDSA private key) and a public derivation string (which can be modified to obtain multiple different keys), and outputs a new key pair (private key and public key), sometimes an ECDSA key pair. An ECDSA key pair is of the form (Q,x) where Q is the public key, x is the private key, and Q=x·G where G is the generator (or base point) of the Elliptic curve being used. One particular standard for this is the BIP032/BIP044 derivation method.

In some cases, there is no single entity who holds the master key or any subsequently derived keys, and there is a set of parties who share the key, and they compute the ECDSA signature needed to transfer funds using secure multiparty computation (MPC); also known as threshold ECDSA signatures. In this case, the parties also use MPC in order to compute the derivation key, since the aim is that no key is ever held by any single party at any time. In this MPC, each party inputs its share of the key that is being used in the derivation, and the parties receive as output the shares of the new derivation key. This derivation can be achieved using standard known MPC techniques like garbled circuits for two parties or authenticated garbling of the BMR circuit for many parties. However, MPC does not prevent parties from changing their local inputs. In such a case, a malicious party can input an incorrect share of the derivation key and the result would be a derivation key that is a valid ECDSA key, but cannot be reconstructed from the master key. Thus, if the key shares are lost, then the backup master key cannot be used to recover the private key, resulting in the cryptocurrency that is protected by that key being permanently lost.

SUMMARY OF THE INVENTION

The subject matter disclosed below can be used for any derivation method, not limited to crypto currencies, and for any key-pair of the same form as ECDSA. Thus, it can also work for Schnorr-based signatures, like EdDSA.

It is an object of the subject matter to disclose a system for enforcing correctness of a derivation key, comprising multiple computerized nodes, comprising a storage module configured to store a share of a key used as an input of a function generating the derivation key, a communication module configured to exchange information between the multiple computerized nodes, and a processing module configured to perform a set of instructions, comprising receiving a request to create the derivation key, performing an MPC process between the multiple computerized nodes, said MPC process is performed multiple times, in each time the MPC process comprises receiving the key shares as input, randomly selecting a function from a plurality of optional functions, one function of the plurality of optional function outputs key shares of the derivation key and another optional function outputs values that can be verified by the computerized nodes, outputting the outputs of the selected function to the multiple computerized nodes, the multiple computerized nodes lack access to the selected function, the multiple computerized nodes perform computations on the received outputs and exchange outputs of the computations to estimate correction of the key shares inputted into the MPC process.

In some cases, the multiple computerized nodes are further configured to compute and exchange a first commitment message which is a cryptographic function receiving as input the output of the selected function. In some cases, the cryptographic function comprises an ECDSA function computed on the output of the selected function and a hash function performed on the output of the ECDSA function.

In some cases, the processing module is further configured to receive a second commitment message from another computerized node of the multiple computerized nodes, said second commitment message comprises a key share sent from the selected function to the other computerized node and to check correctness of the input provided by the other computerized node.

In some cases, the processing module is configured to identify that the selected function is the key derivation function, identify that the other computerized node inputted a correct value and to assign the value provided from the MPC process as a key share of the derivation key. In some cases, the processing module assigns the value provided from the MPC process as a key share of the derivation key after checking performance of the optional function that outputs values that can be verified by the computerized nodes performed by the MPC process, said processing module checks performance of the optional function using the commitment message received from another node as input. In some cases, the MPC process and estimating correction of the key shares are performed until a predefined condition is met. In some cases, the multiple computerized nodes are configured to check the commitment from the other nodes and verifying that the selected function is, assigning the output of the selected function as the key shares of the derivation key.

In some cases, the multiple computerized nodes comprise instructions to perform two different optional functions having output values that can be verified by the computerized nodes, wherein one of the two optional functions outputs two equal random values and another optional function outputs two random values having a predefined additive share.

In some cases, the computerized nodes assign the output of the MPC process as a share of the derivation key in case all potential candidates of derivation key share that fail to match the optional functions that can be verified by the computerized nodes are equal in all outputs of the MPC process.

BRIEF DESCRIPTION OF THE DRAWINGS

The invention may be more clearly understood upon reading of the following detailed description of non-limiting exemplary embodiments thereof, with reference to the following drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF THE INVENTION

Illustrative embodiments of the invention are described below. In the interest of clarity, not all features/components of an actual implementation are necessarily described.

The present invention discloses a system and method for managing derivation of a cryptographic key, also referred herein as key. The method is performed by multiple computerized nodes used to store shares of the key. The key may be used in the context of money transfer, for example a Blockchain-related transfer, when a cryptographic key is required to transfer the funds. The key may be used for any other purpose selected by a person skilled in the art. The method is configured to verify, with a very high probability, that the key shares inputted by all the nodes are correct and can be used to create a valid derivation key. The method is performed multiple times, for example in the range of 16-128, and each time the inputted shares to the derivation key are considered valid, reduces the probability that the node actual input is false.

Each of the multiple computerized nodes stores a share of the key used to derive a derivation key. The key shares may be generated using a multi-party computation (MPC) process. The nodes also store a set of instructions that are detailed below. Each node comprises a communication module configured to exchange messages with the multiple computerized nodes. The communication module may exchange signals via wireless or wired channels, for example via the internet, on cables, via a cellular network or any communication technique desired by a person skilled in the art. The nodes also comprise a memory unit configured to store a set of instructions to be executed by the nodes and to store the messages received from the multiple computerized nodes. The messages received from the multiple computerized nodes may be associated with an identifier of the specific node of the multiple computerized nodes that sent the message.

Figure 1:
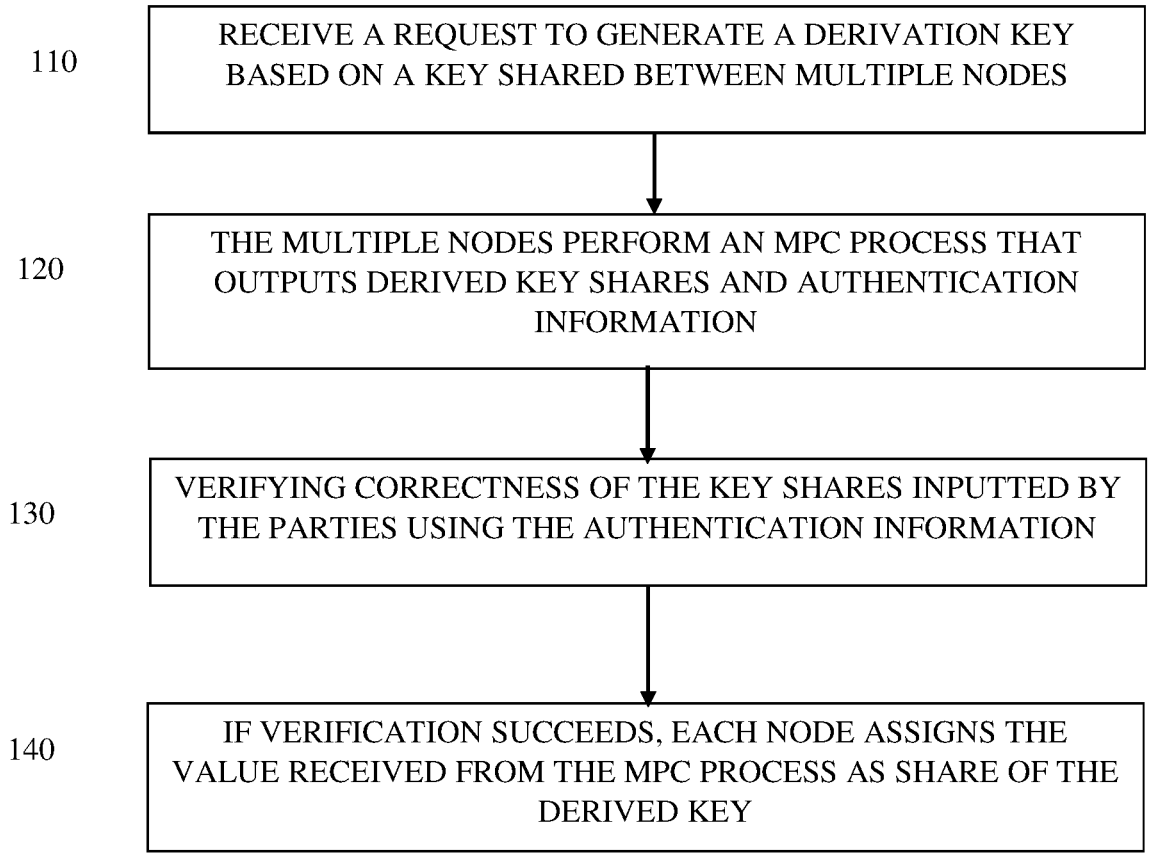
FIG. 1 discloses a method of deriving a key, according to exemplary embodiments of the subject matter.

FIG. 1 discloses a method of deriving a key, according to exemplary embodiments of the subject matter.

Step 110 discloses the multiple computerized nodes receive a request to generate a derivation key based on a key shared between multiple nodes. The request may be sent before transferring funds associated with the key. The nodes may be computers, servers, mobile electronic devices, cellular phones, and any electronic devices having a memory, communication module and memory for storing the key share and performing the instructions disclosed herein. Each node of the multiple computerized nodes performs the method below multiple times, as the logic output in each time is that there is 50% that the node provides a false value as the key share without being caught. Thus, performing the method 20 times and outputting that the value received from the nodes are correct implies that the likelihood of a false value received from the node is less than 1 to million. The number of times a value is requested from the node may be defined by a person skilled in the art.

Step 120 discloses the multiple nodes compute the derivation key using an MPC process. The MPC process is performed in a manner in which the entire key and the derivation key are never accessible to a single entity. The MPC process receives as input a derivation string which is public to all the nodes, and key shares provided by the nodes. The output of the MPC process is shares of the derivation key and authentication information. Each node receives a share of the derivation key. In typical embodiments of the invention, such a derivation key can be computed by computing the HMAC function with the key and public derivation string via MPC, so that the input and output key shares of a node are not revealed to any other node. The authentication information may be used to finalize the verifying correctness of the key shares. The MPC process is performed multiple times, as desired by the person skilled in the art, for example 20 times, 64 times, 144 times and the like. In some cases, in each time the output of the MPC process may be the authentication information or the derivation key shares. At the end of the MPC process, the nodes receive both the authentication information and the derivation key shares in a very high probability.

Step 130 discloses verifying correctness of the key shares inputted by the nodes for the key derivation process. The correctness of the key shares is performed by exchanging messages between the multiple computerized nodes, as detailed below. At least some of the messages contain outputs of cryptographic operations. In the end of the verifying correctness phase, the nodes can verify in a very high probability whether or not the other node inputted the correct share for the key derivation process.

Step 140 discloses the nodes assigning the values received in step 120 as shares of the derivation key, if the verification performed in step 130 succeeds.

Figure 2:
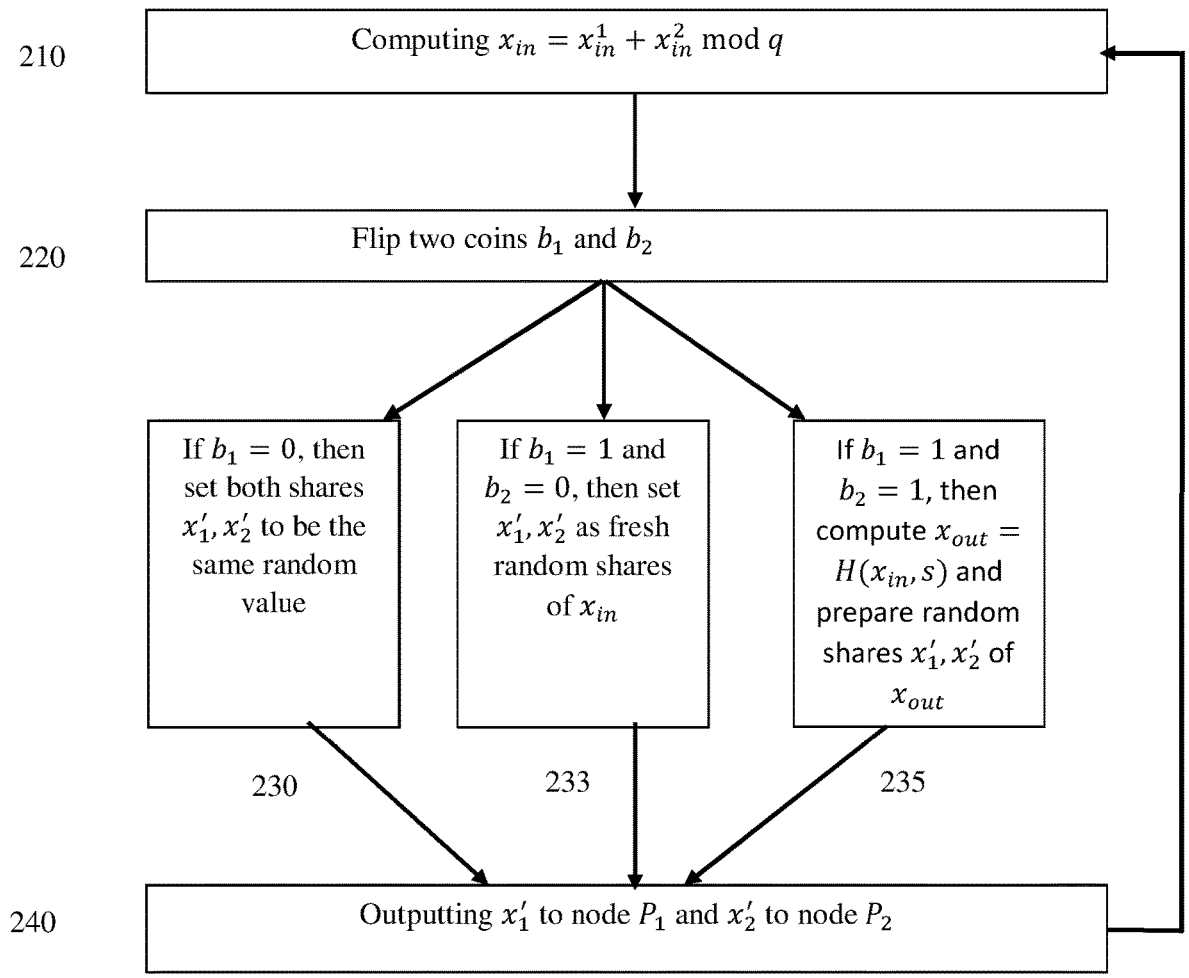
FIG. 2 discloses a method for enforcing correctness of key shares during a key derivation process, according to exemplary embodiments of the subject matter; and, FIG. 3 discloses a method for computing and encrypting the output of the selected function to verify correctness of the key shares, according to exemplary embodiments of the subject matter.

FIG. 2 discloses a method for performing an MPC process configured to output shares of the derivation key and authentication information, according to exemplary embodiments of the subject matter. The MPC process is performed multiple times, each time the MPC process outputs either the shares of the derivation key or authentication information. The number of multiple times may be predefined, or the MPC process may terminate in response to a predefined event, for example after all the optional options elaborated in steps 230, 233 and 235. Thus, for example, in the first and second time, the coins indicate that the key derivation option is selected. In occurrences number 3, 7 and 9-11, the shares are created according to step 233 and in occurrences number 4-6, 8 and 12, the shares are created according to step 235.

Step 210 discloses computing $x_{in} = x_{in}^1 + x_{in}^2$ mod q. It should be noted that none of the nodes that perform the MPC process hold or have access to both $x_{in}^1$ and $x_{in}^2$ during any of the processes described in the subject matter. $x_{in}^1$ is the share stored in node 1 and $x_{in}^2$ is the share stored in node 2. $x_{in}$ denotes the key from which the derivation key is derived.

Step 220 discloses Flip two coins $b_1$ and $b_2$. The two coins represent 4 options having substantially the same probability to take place. As the next steps are performed multiple times, the MPC process performed by the nodes requires that all 4 options are randomly selected in a very high likelihood, for example a probability of at least 99.99%. Flipping the coins may be performed using a Bernouli process implemented on a computer software running on an MPC process between the nodes. The outcome of the coins is not revealed to any of the nodes. For simplicity, the coins may have a value of "0" or "1". The flip coin is a representation of a random selection of one option from multiple options disclosed in steps 230, 233 and 235. The options may be selected in equal or unequal probabilities.

After flipping the coins, the MPC process sets two values, each value is configured to be outputted to another node. In case the first coin has a value "0", as disclosed in step 230, the MPC process sets both shares $x'_1$, $x'_2$ to be the same random value. In case the first coin has a value "1" and the second coin has a value "0", as disclosed in step 233, the MPC process sets both shares $x'_1$, $x'_2$ to be random shares of $x_{in}$ (that is, $x'_1+x'_2=x_{in}$ mod q). In case the first coin has a value "1" and the second coin has a value "1", as disclosed in step 235, the MPC process computes $x_{out}=H(x_{in},s)$ and prepare random shares $x'_1$, $x'_2$ of $x_{out}$. It should be noted that the mathematical computations disclosed in steps 233 and 235 are exemplary only, and represent any selection of random values that can be used to verify the correctness in the method described in FIG. 3. The nodes are not aware at any stage of the option selected by the coin flip.

Then, in step 240, the share $x'_1$ is outputted to node $P_1$ and the share $x'_2$ is outputted to node $P_2$. Again, also when outputting the shares $x'_1$ and $x'_2$, none of the nodes has access to the shares. In some cases, the process is repeated after step 240, as shown in FIG. 2. In some other cases, coin flip is performed multiple times, for example 64 times, each time is assigned an identifier, then, the selected option is performed, according to the value of the identifier. For example, value "00" indicates that both coin flips were assigned "0". Then, all the 64 outputs are outputted to each node using the MPC process, and each node has 64 occurrences of outputs, for example, 20 key derivation shares, 20 random shares and 24 random additive shares.

Figure 3:
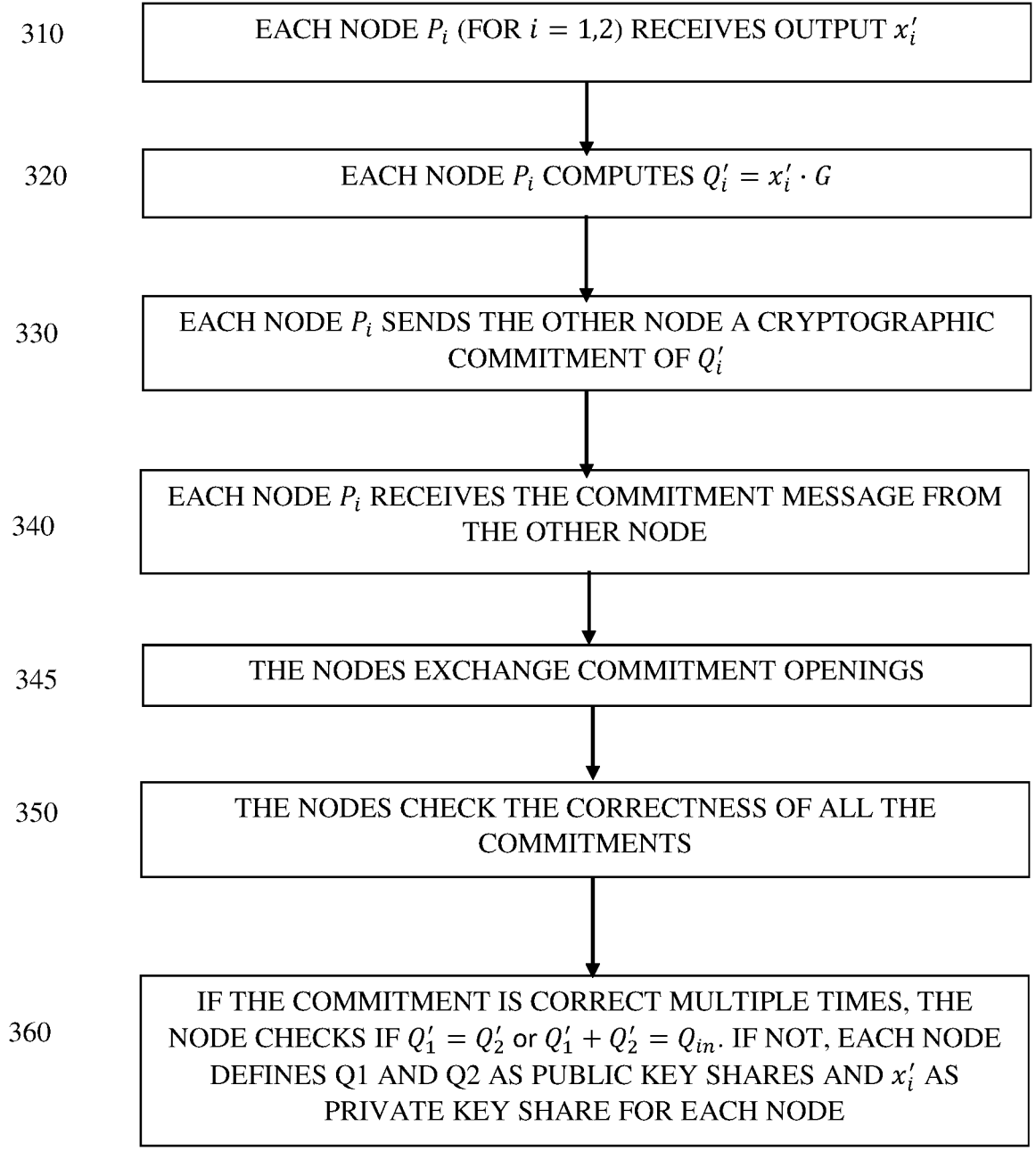

FIG. 3 discloses a method for computing and encrypting the output of the selected function to verify correctness of the key shares, according to exemplary embodiments of the subject matter.

In step 310, each node $P_i$ (for i=1, 2) receives function output $x'_i$. For example, node $P_1$ receives $X_1$ and $P_2$ receives $X_2$.

In step 320, each node $P_i$ computes $Q'_i=x'_i \cdot G$. G is the generator (or base point) of the Elliptic curve being used. It should be noted that $x'_i$ cannot be extracted from $Q'_i$, as G is an irreversible function.

In step 330, each node $P_i$ sends the other node a cryptographic commitment of $Q'_i$. The commitment is defined as a value that bounds the node to the value but does not reveal it. The commitment may be computed, for example, by choosing a random $r_i$ of length 128 bits and computing $c_i=SHA256(Q'_i, r_i)$. Then, the nodes exchange the value $c_i$.

In step 340, each node $P_i$ receives the cryptographic commitment from the other node. exchange of the commitments, commitment openings and additional messages between the nodes may be performed via a wired or wireless channel. In some exemplary cases, the nodes are different and distinct entities located nearby, even in the same building or server farm/cluster.

In step 345, the nodes exchange commitment openings. The commitment openings may be the commitment message before the hash function is applied thereto. For example, the commitment opening is $(Q'_i, r_i)$ while the commitment message is $c_i=SHA256(Q'_i, r_i)$.

In step 345, the nodes check the result of the commitments. Checking may be performed by applying the hash function on the commitment opening and comparing the output of the hash function to the commitment message.

In step 360, if the commitment is correct multiple times and if $Q'_1=Q'_2$ or $Q'_1+Q'_2=Q_{in}$, and the multiple $Q_1$ and $Q_2$ values received in each node are the same in all iterations, define $Q_1$ and $Q_2$ as public key shares, $x'_i$ as private key share for each node, and $Q=Q_1+Q_2$ as the derived public key. The method may define one or more functions that can be verifiable by the nodes without revealing the outputs X1 and X2. As noted above, one optional verifiable function outputs two random and equal values. Thus, the nodes can check whether Q1 equals Q2 and thus X1 equals X2. Otherwise, the nodes conclude that the selected function is the function that computes the derivation key. In such a case, the outputted values X1 and X2 are stored in the nodes as the shares of the derivation key. Another verifiable function is outputting two additive shares of Xin.

In case the selected function outputs equal random values, no node can modify the $Q''_i$ value that it sends in the commitment, or the node will be detected cheating, as all the nodes should have the same value and this will be different. The malicious node may send a different value and hope that this will fall into the case another verifiable function selected or being the same value as stored in other executions, but since $Q'_j$ is just a random value, the chance of it falling into another case is extremely small.

Assume that a node inputs an incorrect share into the computation and the selected function outputs two values such that X1+X2 equals Xin mod q. In this case, the malicious node needs to make the result equal $Q_{in}$. This requires it changing its $Q'_j$ value since the input share was incorrect and $Q_{in}$ is publicly known. However, by what we have just explained, it cannot change $Q'_j$ if b_1=0 or it will be detected. Thus, such a strategy is doomed to fail and have the cheating be detected.

Finally, assume that both nodes input correct shares but an attacker wishes to make the resulting key be incorrect. In order to do so, the attacker has to change the $Q'_j$ value it received. Again, this strategy is doomed to fail as the attacker must input its correct share and cannot change its output; else, it will be detected with a very high probability.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A system for enforcing correctness of a derivation key, comprising:
multiple computerized nodes configured to store a share of a key used as an input of a function generating the derivation key, a communication module configured to exchange information between the multiple computerized nodes, said multiple computerized nodes are implemented in computer hardware and configured to perform a set of instructions, comprising:
receiving a request to create the derivation key;
performing a multiparty computation (MPC) process between the multiple computerized nodes, said MPC process is performed multiple times, in each time the MPC process comprises:

(a) receiving the key shares as input,
(b) randomly selecting a function from a plurality of optional functions, wherein the multiple computerized nodes are not aware of the randomly-selected function, wherein one optional function of the plurality of optional functions outputs key shares of the derivation key and another optional function of the plurality of optional functions outputs values that are verifiable by the computerized nodes and
(c) performing the MPC process using the randomly-selected function, thereby producing outputs of the randomly-selected function;

providing the outputs of the randomly-selected function to the multiple computerized nodes, the multiple computerized nodes lack access to the selected function;

wherein in case the another optional function is selected, the multiple computerized nodes perform computations on the received outputs and exchange outputs of the computations to estimate correction of the key shares inputted into the MPC process, and wherein the multiple computerized nodes assign the value provided from the MPC process as a key share of the derivation key after checking performance of the optional function that outputs values that are verifiable by the computerized nodes performed by the MPC process, said multiple computerized nodes check performance of the optional function using the commitment message received from another node as input.

2. The system of claim 1, wherein the multiple computerized nodes are further configured to compute and exchange a first commitment message which is a cryptographic function receiving as input the output of the selected function.

3. The system of claim 2, wherein the cryptographic function comprises an ECDSA function computed on the output of the selected function and a hash function performed on the output of the ECDSA function.

4. The system of claim 2, wherein the multiple computerized nodes are further configured to receive a second commitment message from another computerized node of the multiple computerized nodes, said second commitment message comprises a key share sent from the selected function to the other computerized node and to check correctness of the input provided by the other computerized node.

5. The system of claim 1, wherein the multiple computerized nodes are configured to identify that the selected function is the key derivation function, identify that the other computerized node inputted a correct value and to assign the value provided from the MPC process as a key share of the derivation key.

6. The system according to claim 1, wherein the MPC process and estimating correction of the key shares are performed until a predefined condition is met.

7. The system according to claim 1, wherein the multiple computerized nodes are configured to check the commitment from the other nodes and verifying that the selected function is, assigning the output of the selected function as the key shares of the derivation key.

8. The system according to claim 1, wherein the multiple computerized nodes comprise instructions to perform two different optional functions having output values that are verifiable by the computerized nodes, wherein one of the two optional functions outputs two equal random values and another optional function outputs two random values having a predefined additive share.

9. The system according to claim 1, wherein the computerized nodes assign the output of the MPC process as a share of the derivation key in case all potential candidates of derivation key share that fail to match the optional functions that are verifiable by the computerized nodes are equal in all outputs of the MPC process.

10. A system for enforcing correctness of a derivation key, comprising:
multiple computerized nodes configured to store a share of a key used as an input of a function generating the derivation key, a communication module configured to exchange information between the multiple computerized nodes, said multiple computerized nodes are implemented in computer hardware and configured to perform a set of instructions, comprising:
receiving a request to create the derivation key;
performing a multiparty computation (MPC) process between the multiple computerized nodes, said MPC process is performed multiple times, in each time the MPC process comprises:
(a) receiving the key shares as input,
(b) randomly selecting a function from a plurality of optional functions, wherein the multiple computerized nodes are not aware of the randomly-selected function, wherein one optional function of the plurality of optional functions outputs key shares of the derivation key and another optional function of the plurality of optional functions outputs values that are verifiable by the computerized nodes and
(c) performing the MPC process using the randomly-selected function, thereby producing outputs of the randomly-selected function;

providing the outputs of the randomly-selected function to the multiple computerized nodes, the multiple computerized nodes lack access to the selected function;

wherein in case the another optional function is selected, the multiple computerized nodes perform computations on the received outputs and exchange outputs of the computations to estimate correction of the key shares inputted into the MPC process, and wherein the multiple computerized nodes comprise instructions to perform two different optional functions having output values that are verifiable by the computerized nodes, wherein one of the two optional functions outputs two equal random values and another optional function outputs two random values having a predefined additive share.

11. The system of claim 10, wherein the multiple computerized nodes are further configured to compute and exchange a first commitment message which is a cryptographic function receiving as input the output of the selected function.

12. The system of claim 11, wherein the cryptographic function comprises an ECDSA function computed on the output of the selected function and a hash function performed on the output of the ECDSA function.

13. The system of claim 11, wherein the multiple computerized nodes are further configured to receive a second commitment message from another computerized node of the multiple computerized nodes, said second commitment message comprises a key share sent from the selected function to the other computerized node and to check correctness of the input provided by the other computerized node.

14. The system of claim 10, wherein the multiple computerized nodes are configured to identify that the selected function is the key derivation function, identify that the other computerized node inputted a correct value and to assign the value provided from the MPC process as a key share of the derivation key.

15. The system of claim 10, wherein the multiple computerized nodes assign the value provided from the MPC process as a key share of the derivation key after checking performance of the optional function that outputs values that are verifiable by the computerized nodes performed by the MPC process, said multiple computerized nodes check performance of the optional function using the commitment message received from another node as input.

16. The system according to claim 10, wherein the MPC process and estimating correction of the key shares are performed until a predefined condition is met.

17. The system according to claim 10, wherein the multiple computerized nodes are configured to check the commitment from the other nodes and verifying that the selected function is, assigning the output of the selected function as the key shares of the derivation key.

18. The system according to claim 10, wherein the computerized nodes assign the output of the MPC process as a share of the derivation key in case all potential candidates of derivation key share that fail to match the optional functions that are verifiable by the computerized nodes are equal in all outputs of the MPC process.

\* \* \* \* \*